US010482606B2

(12) United States Patent
Higgins et al.

(10) Patent No.: US 10,482,606 B2
(45) Date of Patent: Nov. 19, 2019

(54) MEDICAL IMAGE REPORTING SYSTEM AND METHOD

(71) Applicant: The Penn State Research Foundation, University Park, PA (US)

(72) Inventors: William E. Higgins, State College, PA (US); Jason D. Gibbs, State College, PA (US); Kun-Chang Yu, State College, PA (US); Michael W. Graham, State College, PA (US); Kongkuo Lu, Sugar Land, TX (US)

(73) Assignee: The Penn State Research Foundation, University Park, PA (US)

( * ) Notice: Subject to any disclaimer, the term of this patent is extended or adjusted under 35 U.S.C. 154(b) by 149 days.

(21) Appl. No.: 15/596,553

(22) Filed: May 16, 2017

(65) Prior Publication Data

US 2017/0345155 A1    Nov. 30, 2017

Related U.S. Application Data

(63) Continuation of application No. 12/866,758, filed as application No. PCT/US2009/034197 on Feb. 16, 2009, now Pat. No. 9,672,631.

(Continued)

(51) Int. Cl.
   *G06T 7/162*     (2017.01)
   *G06T 7/12*      (2017.01)

(52) U.S. Cl.
   CPC .............. *G06T 7/162* (2017.01); *G06T 7/12* (2017.01); *G06T 2207/20044* (2013.01); *G06T 2207/30061* (2013.01)

(58) Field of Classification Search
   CPC . G06T 7/162; G06T 7/12; G06T 2207/20044; G06T 2207/30061
   (Continued)

(56) References Cited

U.S. PATENT DOCUMENTS

2001/0044576 A1    11/2001  Vining
2005/0107679 A1     5/2005  Geiger et al.
(Continued)

FOREIGN PATENT DOCUMENTS

WO    2001/078010    10/2001

OTHER PUBLICATIONS

Yan, Michelle, et al. "Automatic detection of pelvic lymph nodes using multiple MR sequences." Medical Imaging 2007: Computer-Aided Diagnosis. vol. 6514. International Society for Optics and Photonics, 2007. (Year: 2007).*

(Continued)

*Primary Examiner* — Jonathan S Lee
(74) *Attorney, Agent, or Firm* — Dinsmore & Shohl LLP

(57) ABSTRACT

This invention relates generally to medical imaging and, in particular, to a method and system for automatic lymph node station mapping, automatic path or route report generation. A computer-based system for automatically locating the central chest lymph-node stations in a 3D MDCT image is described. Automated analysis methods extract the airway tree, airway-tree centerlines, aorta, pulmonary artery, lungs, key skeletal structures, and major-airway labels. Geometrical and anatomical cues arising from the extracted structures are used to localize the major nodal stations. The system calculates and displays the nodal stations in 3D. Visualization tools within the system enable the user to interact with the stations to locate visible lymph nodes.

19 Claims, 11 Drawing Sheets

Related U.S. Application Data

(60) Provisional application No. 61/117,334, filed on Nov. 24, 2008, provisional application No. 61/028,562, filed on Feb. 14, 2008, provisional application No. 61/028,607, filed on Feb. 14, 2008.

(58) Field of Classification Search
USPC .......................................................... 382/128
See application file for complete search history.

(56) References Cited

U.S. PATENT DOCUMENTS

| | | | |
|---|---|---|---|
| 2006/0149134 A1 | 7/2006 | Soper et al. | |
| 2006/0171586 A1 | 8/2006 | Georgescu et al. | |
| 2007/0092864 A1 | 4/2007 | Reinhardt et al. | |
| 2007/0237373 A1* | 10/2007 | Kiraly | G06T 7/73 382/128 |
| 2008/0317314 A1* | 12/2008 | Schwartz | G06K 9/34 382/131 |
| 2009/0005693 A1* | 1/2009 | Brauner | A61B 6/508 600/481 |
| 2009/0156895 A1* | 6/2009 | Higgins | G06T 19/003 600/104 |
| 2009/0226060 A1* | 9/2009 | Gering | G06T 7/11 382/128 |
| 2010/0278412 A1 | 11/2010 | Song et al. | |
| 2010/0310146 A1* | 12/2010 | Higgins | G06F 19/00 382/131 |

OTHER PUBLICATIONS

Yan, Jiayong, et al. "Marker-controlled watershed for lymphoma segmentation in sequential CT images." Medical physics 33.7Part1 (2006): 2452-2460. (Year: 2006).*
Herth, Felix JF, et al. "Transbronchial versus transesophageal ultrasound-guided aspiration of enlarged mediastinal lymph nodes." American journal of respiratory and critical care medicine 171.10 (2005): 1164-1167. (Year: 2005).*
Gibbs, Jason David. "Three dimensional route planning for medical image reporting and endoscopic guidance." (2008). (Year: 2008 ).*
De Leyn, Paul, et al. "ESTS guidelines for preoperative lymph node staging for non-small cell lung cancer." (2007): 1-8. (Year: 2007 ).*
Pisupati, C. et al., Segmentation of 3D pulmonary trees using mathematical morphology, Mathematical Morphology and Its Applications to Image and Signal Processing, pp. 409-416, May 1996.
Preteux, F et al., Modeling, segmentation and caliber estimation of bronchi in high-resolution computerized tomography, Journal of Electronic Imaging, 8(1): 36-45, Jan. 1999.
Kiraly, A., Virtual bronchoscopy for quantitative airway analysis, in SPIE Medical Imaging 2005: Physiology, Function, and Structure from Medical Images, 5746: 369-383, Apr. 2005.
Tschirren, J. et al., Intrathoracic airway trees: segmentation and airway morphology analysis from low-dose CT scans, IEEE Transactions on Medical Imaging, 24(12): 1529-1539, Dec. 2005.
Lorensen, W. et al., Marching cubes: A high resolution 3D surface construction algorithm, Computer Graphics, 21 (4): 163-169, Jul. 1987.
Helferty, J. et al., System for live virtual-endoscopic guidance of bronchoscopy, IEEE Conf Computer Vision and Pattern Recognition, 3: 68-75, Jun. 20-26, 2005.
Li, K. et al., Optimal surface segmentation in volumetric images—a graph-theoretic approach, IEEE Trans. Pan. Anal. Machine Intell., 28(1): 119-134, Jan. 2006.
Saragaglia, A. et al., Automated volumetric approach for quantifying bronchial wall remodeling in MDCT, SPIE Conf. on Mathematics of Data/Image Pattern Recognition, Compression, and Encryption with Applications IX, 6315(1 ): 63150M, 2006.
Helferty, J. et al., Computer-based system for the virtual-endoscopic guidance of bronchoscopy, Computer Vision and Image Understanding, 108: 171-187, Oct.-Nov. 2007.

Gibbs, J. et al., Integrated system for planning peripheral bronchoscopic procedures, SPIE Medical Imaging 2008: Visualization, Image-Guided Procedures and Modeling, 6918: 2008.
Higgins, W. et al., 3D CT-video fusion for image-guided bronchoscopy, Computerized Medical Imaging and Graphics, 32: 159-73, 2008.
Mori, K. et al., Automated anatomical labeling of the bronchial branch and its application to the virtual bronchoscopy system, IEEE Trans. Medical Imaging, 19(2): 103-14, Feb. 2000.
Tschirren, J. et al., Matching and anatomical labeling of human airway tree, IEEE Trans. Medical Imaging, 24(12): 1540-1547, Dec. 2005.
Mori, K. et al., Automated nomenclature of bronchial branches extracted from CT images and its application to biopsy path planning in virtual bronchoscopy, Medical Image Computing and Computer-Assisted Intervention, 3750: 854-861 , 2005.
Graham, M. et al., Globally optimal model-based matching of anatomical trees, SPIE Medical Imaging 2006: Image Processing, 6144: 373-388, Mar. 2006.
Graham, M. et al., Optimal graph-theoretic approach to 3D anatomical tree matching, IEEE Int. Symp. on Biomedical Imaging, pp. 109-1 12, 2006.
Kukuk, M., An "optimal" k-needle placement strategy and its application to guiding transbronchial needle aspirations., Computer Aided Surgery, 9(6): 261-290, 2004.
Gibbs, J. et al., 3D path planning and extension for endoscopic guidance, SPIE Medical Imaging 2007: Visualization and Image-Guided Procedures, 6509: 6509 I K-I-6509 I K-13, 2007.
Dalrymple, N. et al., Introduction to the language of three-dimensional imaging with multidetector CT, Radiographics, 25: 1409-1428, Sep.-Oct. 2005.
Hopper, K. et al., Mucosal detail at CT virtual reality: surface versus volume rendering, Radiology, 214: 517-522, Feb. 2000.
Summers, R. et al., Virtual bronchoscopy: segmentation method for real-time display, Radiology, 200, Sep. 1996.
Mori, K. et al., Recognition of bronchus in three dimensional X-Ray CT images with application to virtualized bronchoscopy system, Proc. 13th Int. Conf. Pattern Recognition III, pp. 528-532, Aug. 1996.
Kiraly, A. et al., 3D human airway segmentation methods for virtual bronchoscopy, Academic Radiology, 9: 153-1 168, Oct. 2002.
Fetita, C. et al., Pulmonary airways: 3-D reconstruction from multislice CT and clinical investigation, IEEE Transactions on Medical Imaging, 23: 1353-1364, Nov. 2004.
Schlathoelter, T. et al., Simultaneous segmentation and tree reconstruction of the airways for virtual bronchoscopy, SPIE Medical Imaging,4684: 103-113, 2002.
Mayer, D. et al., Hybrid segmentation and virtual bronchoscopy based on CT images, Academic Radiology, 11: 551-565, May 2004.
Asano, F. et al., Ultrathin bronchoscopic barium marking with virtual bronchoscopic navigation for fluoroscopy-assisted thoracoscopic surgery, Chest, 126(5): 1687-1693, Nov. 2004.
Asano, F. et al., A virtual bronchoscopic navigation system for pulmonary peripheral lesions, Chest, 130(2): 559-66, Aug. 2006.
Shinagawa, N. et al., Virtual bronchoscopic navigation system shortens the examination time-feasibility study of virtual bronchoscopic navigation system, Lung Cancer, 56: 201-206, 2007.
Graham, M. et al., Image-guided bronchoscopy for peripheral nodule biopsy: A human feasibility study, Proceedings of the American Thoracic Society, May 2008.
Falcao, A. et al., User-steered image segmentation paradigms: Live wire and live lane, Graphical Models and Image Processing, 60: 233-260, Jul. 1998.
Mortensen, E. et al., Interactive segmentation with intelligent scissors, Graphical Models and Image Processing, 60(5): 349-384, 1998.
Lu, K. et al., Interactive segmentation based on the live wire for 3D CT chest image analysis, International Journal of Computer Assisted Radiology and Surgery, 2: 151-167, Dec. 2007.
Saragaglia, A. et al., Airway wall thickness assessment: a new functionality in virtual bronchoscopy investigation, SPIE Medical Imaging 2007: Physiology, Function, and Structure from Medical Images, 6511(1): 651 10P-1-651 10P-12, 2007.

(56) References Cited

OTHER PUBLICATIONS

Graham, M., Robust Graph-Theoretic Methods for Matching and Labeling Anatomical Trees. PhD thesis, The Pennsylvania State University, 2008.

Johnson, D. et al., On knapsacks, partitions, and a new dynamic programming technique for trees, Mathematics of Operations Research, 8(1): 1-14, Feb. 1983.

Adler, I. et al., A geometric view of parametric linear programming, Algorithmica, 8: 161-176, Jan. 1992.

Helferty, J. et al., Technique for registering 3D virtual CT images to endoscopic video, IEEE Int. Conf. Image Processing, II, pp. 893-896, Oct. 7-10, 2001.

Yu, K. et al., Interactive graphical report enables off-line 3D endobronchial route planning prior to bronchoscopy, Proceedings of the American Thoracic Society, May 2008.

Graham, M. et al., Robust system for human airway tree segmentation, SPIE Medical Imaging, 6914, 2008.

Aykac, D. et al., Segmentation and analysis of the human airway tree from 3D X-ray CT images, IEEE Transactions on Medical Imaging, 22(8): 940-50, Aug. 2003.

Li, H. et al., Vessels as 4-D Curves: Global Minimal 4-D Paths to Extract 3-D Tubular Surfaces and Centerlines, IEEE Transactions on Medical Imaging, IEEEE Service Center, 26(9): 1213-23, Sep. 1, 2007.

Behrens, T. et al., Robust segmentation of tubular structures in 3-D medical images by parametric object detection and tracking, IEEE Transactions on Systems, Man and Cybernetics, Part B: Cybernetics, IEEE Service Center, 33(4): 554-61, Aug. 1, 2003.

Hua, L. et al., Vessels as 4-D Curves: Global Minimal 4-D Paths to Extract 3-D Tubular Surfaces and Centerlines, IEEE Transactions on Medical Imaging, IEEEE Service Center, 26(9): 1213-23, Sep. 1, 2007.

Grady, L. et al. SIAM Journal on Scientific Computing. 2006. vol. 27 Issue 6, p. 1844-1866. 23p.

* cited by examiner

MEDICAL IMAGE REPORTING SYSTEM AND METHOD

REFERENCE TO RELATED APPLICATIONS

This application is a continuation of U.S. patent application Ser. No. 12/866,758, filed Aug. 9, 2010, which is a United States national phase application of Patent Cooperation Treaty No. PCT/US2009/034197, filed Feb. 16, 2009, which claims priority from U.S. Provisional Patent Application Ser. Nos. 61/028,562, filed Feb. 14, 2008; 61/028,607, filed Feb. 14, 2008; and 61/117,334, filed Nov. 24, 2008. The entire content of all of which are incorporated herein by reference.

STATEMENT OF GOVERNMENT SPONSORSHIP

This invention was made with government support under Grant Nos. CA091534 and CA074325 awarded by the National Institutes of Health. The government has certain rights in the invention.

BACKGROUND OF THE INVENTION

Lung cancer remains the leading cause of cancer death in the United States and is expected to account for nearly 30% of all cancer deaths (31% in male, and 26% in female) in 2007 [19]. Central to the lung-cancer diagnosis and staging process is the assessment of the central chest lymph nodes. This assessment typically requires two major stages: (1) location of the lymph nodes in a three-dimensional (3D) high-resolution volumetric multi-detector computed-tomography (MDCT) image of the chest; (2) subsequent nodal sampling using transbronchial needle aspiration (TBNA).

To facilitate the physician in planning and attempting the lymph-node biopsies, two aids are available: (1) anatomical knowledge of the nominal locations of the 14 Mountain-designated mediastinal lymph-node stations [35, 5, 25]; and (2) the Wang's bronchoscopy-based map of possible biopsy sites [48]. Both the Mountain and Wang systems are well established internationally for use in mediastinal lymph-node staging. The Mountain system characterizes station location based on the human anatomy and classifies the stations as N1, N2, or N3 in the TNM staging classification of lung cancer [34]. The Wang system focuses on locating lymph nodes that are reachable through bronchoscopy for TBNA, which facilitates sampling and evaluation of both "T" and "N" status in bronchogenic carcinoma [48]. Its goal is to provide landmarks of lymph-node location for guiding subsequent bronchoscopic biopsy. Both systems play critical roles in the clinical studies of pulmonary disease. However, little work has been done on CT-based lymph-node analysis and research related to the Mountain and Wang systems [36, 33, 35, 2, 5, 25, 48, 39, 3].

Due to the vital role of lymph nodes in lung cancer management, the detection, segmentation, and classification of pulmonary lymph nodes, as well as nodal station definition, are important tasks. Since lymph nodes usually vary dramatically in shape and size, often are poorly presented in CT images, and may contain diffuse components [1], computer-based lymph-node segmentation is extremely difficult.

FIGS. 1(a)-1(b) show examples of a few lymph nodes in human 3D MDCT scan IRB20349.3.3, which has dimensions 512×512×578 and voxel spacing $\Delta x = \Delta y = 0.715$ mm and $\Delta z = 0.5$ mm. All examples and results presented herein are derived from this scan.

Researchers have made some effort to devise methods for lymph-node segmentation [15, 40, 16, 13, 41, 50, 37, 6, 47, 43, 24]. However, so far, there is no reliable segmentation method available, and interactive methods are too time consuming when dealing with high-resolution 3D MDCT images which may have hundreds of slices.

Even though the Mountain and Wang systems exist, there are no computer-based efforts to implement them for 3D MDCT analysis or even simple visualization. The system and methods disclosed herein are believed to fill this gap.

SUMMARY OF THE INVENTION

A computer-based system for automatically defining lymph node stations such as, for example, the Mountain and Wang stations is described. In one embodiment, the system defines the stations based on anatomical cues arising from the definitions of the lymph-node stations. The system displays the stations for a patient. The nodal stations can then be used to highlight a station and guide the user into the 3D station region. The system further can comprise live-wire-based semi-automatic segmentation tools and other utilities.

In one embodiment, a method comprises automatically identifying at least one lymph node station in a thoracic region of a patient. The method comprises the steps of a) calculating a 3D model of the airway tree based on image data; and b) calculating at least one lymph node station based on said image data and using at least one anatomical cue wherein the calculating at least one lymph node station is performed automatically.

In an embodiment, the method further comprises displaying the at least one lymph node station in a view such as a 2D slice or alternative graphical view. The method may further comprise calculating the patient's airways, airway centerlines, aorta, pulmonary artery, lungs, vertebrae, and sternum from the image data. The method may further comprise labeling individual airways of the airway tree.

The method may further comprise accepting input regarding a lymph node of the station and or calculating the lymph node within the station based on said input.

The method may further comprise adjusting the anatomical cues and or adjusting the view of the station.

In another embodiment of the invention, a method for automatically identifying at least one lymph node station in the thoracic region comprises the steps of: a) identifying at least one known anatomical cue; and b) automatically calculating at least one lymph node area using the at least one anatomical cue. The area may be a Mountain Station, Wang Station, lymph cluster, or nodal area.

In another variation of the invention a computing system for calculating at least one lymph node station based on image data of a patient's thoracic region, comprises: a memory for storing the image data; a processor in communication with the memory, the processor being operative to: a) calculate a 3D model of an airway tree of the patient; and b) automatically calculate the at least one lymph node station based on at least one anatomical cue.

The system may further comprise a display in communication with said processor and operative to display a view of the airway tree and lymph node station in 3D. The system may further comprise a processor operative to reconstruct at least one of the following patient anatomies from the group consisting of an aorta, pulmonary artery, lungs, vertebrae, and sternum. In another embodiment the processor is operative to calculate a 3D geometrical shape that defines Mountain station M7.

In another embodiment of the invention a lymph node station mapping method based on image data of a patient of the thoracic region comprises: processing the image data, said processing step comprising (a) automatically defining at least one of the anatomical structures from the group consisting of: airway tree, airway-tree centerlines, aorta, pulmonary artery, lungs, major skeletal structures, and major-airway labels; and (b) defining criteria for MDCT-based station definition based on geometric and anatomical criteria defined by the Mountain system; defining a landmark and a station comprising (a) extracting landmarks for a lymph-node station definition; (b) defining Mountain stations based on said criteria and extracting steps; and (c) demarcating each station with at least one 3D volumetric region; and visualizing the station and lymph-node definition, wherein the visualization step comprises (a) manually refining the region occupied by each lymph-node station using tools; and (b) segmenting visible lymph nodes in the defined station regions.

In one embodiment, extracting landmarks comprises extracting one or more landmarks from the group consisting of the main carina location, trachea, major bronchi, and aortic arch.

In another embodiment, a lymph-node station is defined as single or multiple cuboid regions, based on landmarks extracted from relevant anatomical chest structures. These cuboid regions guide the user to a particular 3D station region directly and force the user to concentrate on a certain region. The invention may comprise a live-wire-based semi-automatic segmentation step, tissue removal tools, and 2D and 3D visualization tools.

The description, objects and advantages of the present invention will become apparent from the detailed description to follow, together with the accompanying drawings. The invention includes any number of combination of method and devices, or aspects of such methods and devices where such combinations are possible. The disclosure and invention specifically include combination of features and steps of various embodiments as well as combinations of the various embodiments where possible.

BRIEF DESCRIPTION OF THE DRAWINGS

FIG. 1(b) Coronal slice y=213.

(FIG. 3(a)) Airway tree with centerlines. (FIG. 3(b)) Airway tree, represented by its centerlines, with major bronchi labeled. Different colors are used to indicate different types of bronchi. (FIG. 3(c)) Aorta. (FIG. 3(d)) Pulmonary artery. (FIG. 3(e)) Lungs. (FIG. 3(f)) Sternum. (FIG. 3(g)) Vertebrae.

(FIG. 5(a)) Both the airway tree and segmented lymph nodes are displayed. Red lines, inside the airway tree, are center lines. Colored blobs, outside the airway tree, are segmented lymph nodes. Lymph nodes are displayed in colors derived from the Mountain system [25]. (FIG. 5(b)) Both the segmented aorta and pulmonary artery are displayed, along with the airway tree and color-coded lymph nodes. Station M4 is highlighted and presented by two cuboid regions outside the airway tree.

(FIG. 7(a)) Transverse slice Z=251. (FIG. 7(b)) Coronal slice Y=242. (FIG. 7(c)) Sagittal slice X=251. (FIG. 7(d)) 3D surface view.

(FIG. 8(a)) Transverse slice Z=203. (FIG. 8(b)) Coronal slice Y=215. (FIG. 8(c)) Sagittal slice X=256. (FIG. 8(d)) 3D surface view.

(FIG. 9(a)) Transverse slice Z=285. (FIG. 9(b)) Coronal slice Y=235. (FIG. 9(c) Sagittal slice X=204 (right lung). (FIG. 9(d)) Sagittal slice X=310 (left lung). (FIG. 9(e)) 3D surface view.

DETAILED DESCRIPTION OF THE PREFERRED EMBODIMENTS

Figure 1A:
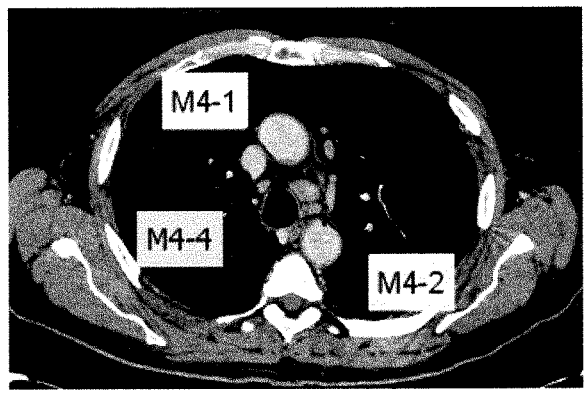
FIGS. 1(a) and 1(b) show examples of lymph nodes for the Mountain station four [33, 25]. In these 2D section views, the lymph nodes are the labeled bright, small, isolated blobs. The nodes labeled M4-1 and M4-4 appear in both sections, while the other nodes only appear in one of the sections. M4 refers to the Mountain station four, FIG. 1(a) Transverse slice z=200.
Figure 1B:
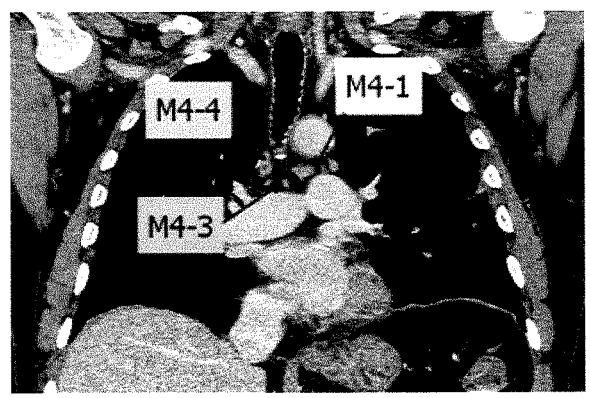

Systems and methods for automatically calculating lymph node stations are described. In one embodiment, the system includes: (1) internal processing methods for extracting various (or "key") anatomical chest structures and other information; (2) automated landmark extraction and lymph-node station definition; and (3) a graphical user interface (GUI) for visualization and interaction of the defined lymph-node stations.

The system may comprise various hardware and or software. A general purpose computer comprising memory, and a processor may be programmed to carry out the method. A stand-alone workstation may also be suitable for carrying out the steps as described herein. The computer or system may comprise means to receive and process input from users and or from the internet or other data transfer protocols. Input means may vary widely and include, for example, a keyboard or mouse. A display or display means may vary widely. Examples of displays include without limitation a monitor, projector, LCD screen, plasma screen, etc.

A first step is to extract anatomical chest structures in the 3D MDCT images. The extracted structures are used to define the nodal stations: In one embodiment, the extracted structures are used to define Mountain or Wang stations using criteria established in the Mountain and Wang systems. The nodal stations can be defined anatomically on the basis of the location of pulmonary lymph nodes, in addition to their surrounding chest structures. Several of these structures are extracted automatically from 3D MDCT images.

Additionally, although the invention is described generally in connection with stations such as the Mountain or Wang stations, the invention is not intended to be so limited. A wide range of stations, colonies, clusters, areas, or zones may be determined and visualized in accordance with the present invention.

Following the first step described above, landmarks (or cues) are extracted from the structures to enable automated nodal station definition. In one embodiment, every lymph-node station, derived from the Mountain system, is automatically defined as one or multiple 3D cuboid regions. Such definitions represent stations well and are good for user-friendly visualization and interaction. However, other shapes may be incorporated to represent the nodal station or area.

In one embodiment, after all stations are automatically defined, the user then reviews the defined station regions using 2D or 3D visualization tools and can refine the definitions if necessary. The defined stations facilitate the detection and segmentation of visible lymph nodes. Station labels are then assigned to extracted lymph nodes automatically.

The general procedure for defining the Mountain stations in accordance with one embodiment of the invention is summarized below:

1. Preprocessing:
 (a) Automatically define the anatomical structures from image data (e.g., a 3D MDCT scan): airway tree and airway-tree centerlines, aorta, pulmonary artery, lungs, major skeletal structures, and major-airway labels.
 (b) Define criteria for MDCT-based station definition based on geometric and anatomical criteria defined by the Mountain system.
2. Landmark and Station Definition:
 (a) Extract landmarks (or other cues) for lymph-node station definition, such as the main carina location, trachea, major bronchi, aortic arch, etc.
 (b) Define the Mountain stations based on the previously defined criteria and extracted landmarks. Each station is demarcated by one or more 3D cuboidal volumetric regions or another selected volumetric region.
3. Station Visualization and Final Lymph-Node Definition:

(a) Manually refine the region occupied by each lymph-node station, using tools within the system's GUI. Use 2D slice tools (transverse, coronal, and sagittal views) and a 3D surface rendering tool to review, both locally and globally, the lymph-node stations and existing lymph nodes in a processed MDCT chest scan.
 (b) Use live-wire-based semi-automatic tools to segment visible lymph nodes in the defined station regions [28].
 (c) Add comments on the lymph-node stations and extracted lymph nodes in a complete case report.

The above is applicable to define and visualize other stations (e.g., the Wang stations).

Figure 2:
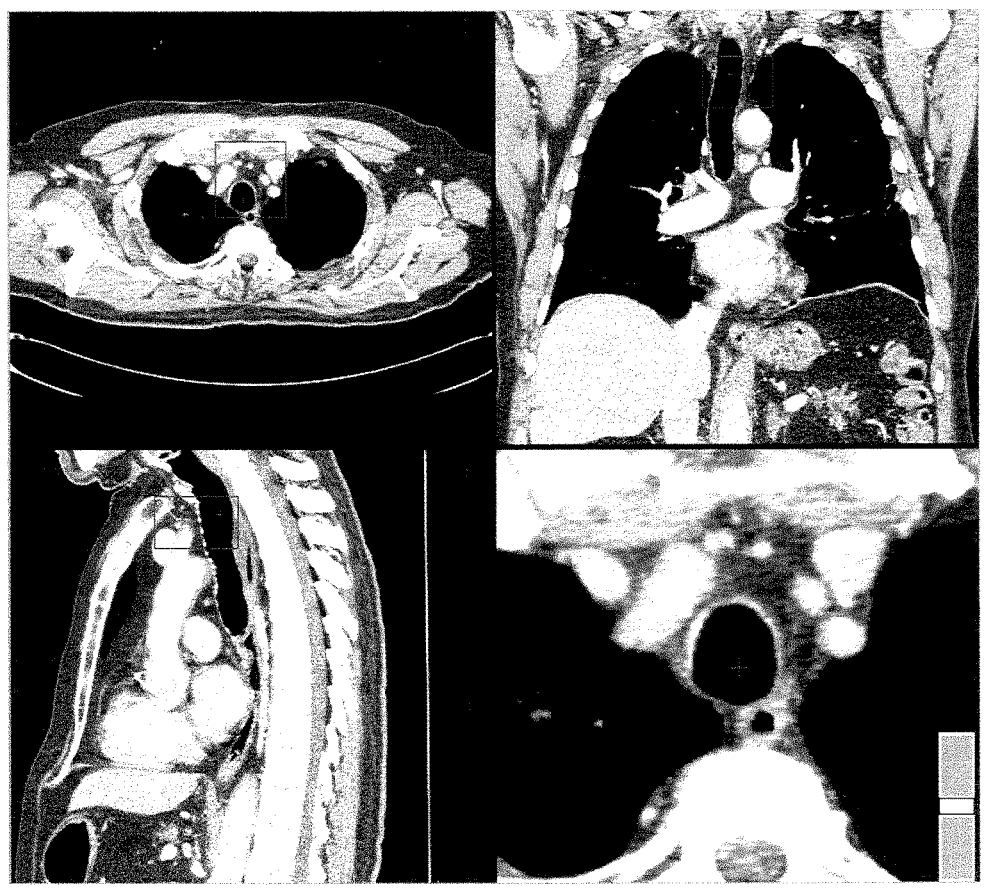
FIG. 2 shows a primary display window of the computer-based system. The user can switch display modes among the slice views, 3D surface view, and endoluminal view.

Table 1 lists selectable lymph-node stations, which are derived from the Mountain and Wang systems. FIG. 2 shows the primary display window of this system. More discussion of the system components is given below.

TABLE 1

Lymph-node stations derived from the Mountain and Wang systems [48, 5, 25, 3]. The user can interact with these stations after a case is processed using the computer-based system.

| Mountain stations | Description | Wang Stations | Description |
| --- | --- | --- | --- |
| M1-2 | Highest mediastinal and upper paratracheal | W1 | Anterior carina |
| M3 | Prevascular and retrotracheal | W2 | Posterior carina |
| M4 | Lower paratracheal | W3 | Right paratrachea |
| M5 | Subaortic (AP window) | W4 | Left paratrachea |
| M6 | Para-aortic | W5 | Right main bronchus |
| M7 | Inferior mediastinal | W6 | Left main bronchus |
| M8 | Paraesophageal (below carina) | W7 | Right upper hilar |
| M9 | Pulmonary ligament | W8 | Sub Carina |
| M10-11 | Hilar and interlobar | W9 | Right lower hilar |
| M12-14 | Lobar, segmental, and subsegmental | W10 | Sub-Sub Carina |
|  |  | W11 | Left hilar |

Image Processing

As discussed above, the definitions of the lymph-node stations rely on many chest structures. In the Mountain and Wang systems, the stations rely on, for example, the airway tree, aorta and great vessel branches derived from it, pulmonary artery and pulmonary veins, lungs, sternum, vertebrae, azygos vein, inominate vein, esophagus, and pulmonary ligament. In one embodiment of the present invention, a plurality of anatomical structures are extracted, and more preferably 5-10, and even more preferably 6 structures are extracted. FIGS. 3(a) to 3(g) shows examples of these structures. Detail related to how these structures are extracted is given below.

Airway Tree

The following describes processes for extracting the airway tree:

1. Automated airway segmentation (FIG. 3(a)) [12].
2. Airway-tree centerline extraction. The centerlines of airway bronchi are defined, and a tree structure is built based on bronchus centerlines to represent the airway tree (FIG. 15(a)).
3. Major-airway labeling. Major bronchial branches, such as the trachea, right and left main bronchi (RMB and LMB), etc, are labeled. This work enables identification of specific airways (FIG. 3(b)).
4. Surface rendering. The airway-tree surface is created and the endoluminal view for every viewing site inside the airway tree, located along centerlines, is created. The airway tree provides a large number of landmarks that are used to localize numerous lymph-node stations in the central chest area. These landmarks are described further below.

Aorta and Pulmonary Artery

Figure 3A:
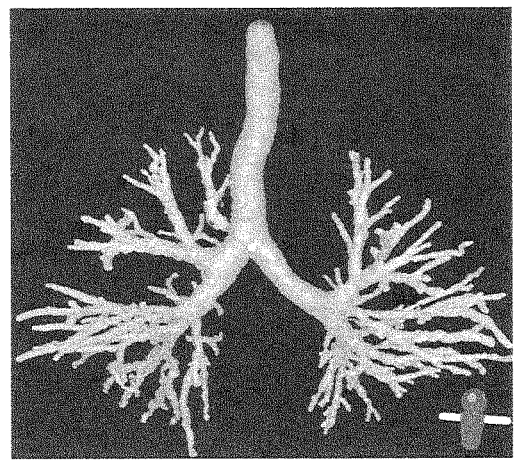
FIGS. 3(a) to 3(g) show six anatomical chest structures including.
Figure 3B:
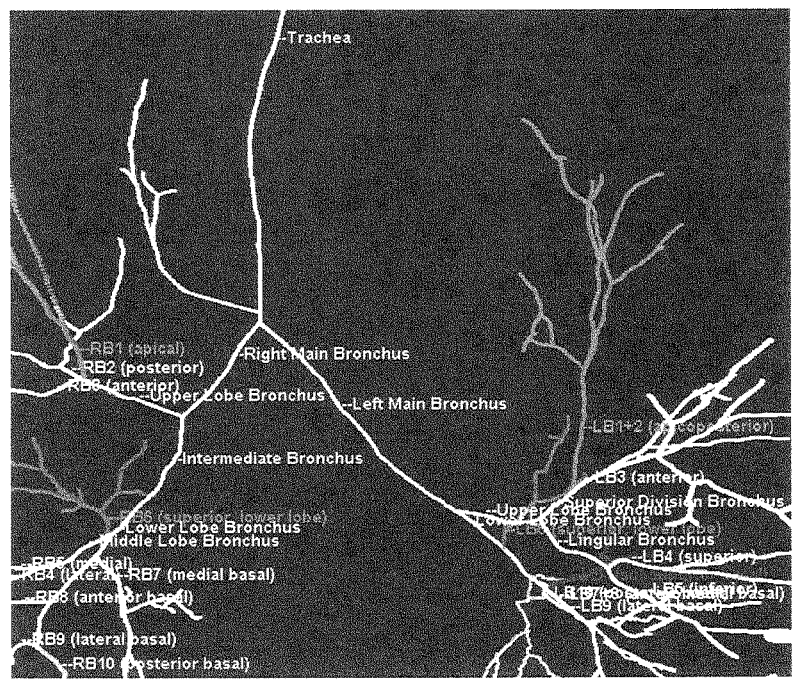
Figure 3C:
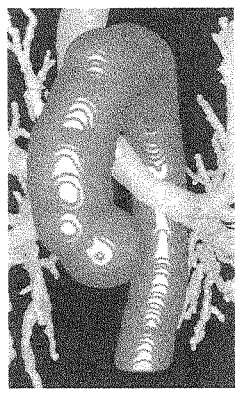
Figure 3F:
Figure 3E:
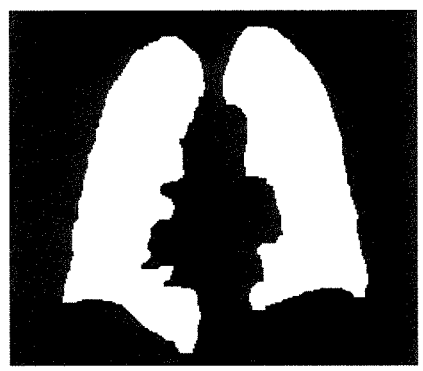
Figure 3G:
Figure 3D:
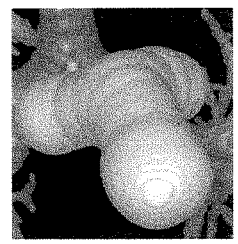

The aorta and pulmonary artery (PA) are two large and vital structures in the central-chest region. They appear in MDCT scans and can be segmented automatically. Several lymph-node stations are defined based on landmarks extracted from the aorta and PA, such as the superior and inferior aspects of the aortic arch. The aorta and pulmonary artery are useful to aortopulmonary (AP) window related biopsy [48]. Both structures constitute "No-Fly" zones (or regions which should not be punctured) during bronchoscopy (e.g., during a TBNA). Segmentation results are shown in FIGS. 3(c)-3(d). The results provide landmarks for the system.

Lungs

The lung regions help bound lymph-node stations and assist in extracting landmarks from other chest structures for station definition. Thus, voxel-level accuracy of the lung segmentation is not required. The following steps are taken for this embodiment (FIG. 3(e)): 1) Exclude the airway tree; 2) Apply optional subsampling; 3) Apply thresholding; 4) Apply binary morphological operations; and 5) Apply region growing.

To reduce the difficulty of lung segmentation, the airway tree is excluded from the input 3D MDCT image. An optional subsampling operation may be applied to reduce the size of the CT image, so as to speed up the segmentation procedure dramatically. Simple thresholding is then applied to isolate voxels with similar intensities as that in regions of the lungs. Binary morphological operations are then applied to isolate and complete lung regions and remove unexpected objects, such as inserted medical devices which may appear during the CT scanning process. Finally, a region growing operation is applied to refine the lung segmentation.

Vertebrae and Sternum

Bone structures, such as the vertebrae and sternum, can be detected because they are presented in high-intensity voxels in CT images. Thresholding followed by morphological operations can successfully isolate these structures. It is not necessary to segment the entire vertebrae and sternum. Instead, the posterior limit of the sternum and anterior limit of the vertebrae are detected. The bound information can then be used to define posterior and/or anterior limits for several stations derived from the Mountain system.

Landmark and Station Definition

Each defined station consists of one or multiple cuboid regions. These regions rely on anatomical and geometrical cues provided by landmarks extracted from the airway tree, aorta, pulmonary artery, etc. In this embodiment, the following landmarks are extracted, grouped by the previously defined key structures:

1. Airway Tree:
   (a) Superior, inferior, anterior, posterior, and right and left lateral limits of the airway walls of major bronchi, such as the trachea, RMB and LMB, the right and left upper lobe bronchi (RULB and LULB), on corresponding 2D MDCT slices.
   (b) Superior and inferior limits of the right inteiniediate bronchus, and the right and left lower lobe bronchi (RLB and LLB).
   (c) Minimum bounding rectilinear regions that encompass the segmental and subsegmental bronchi in the right upper lobe (RUL), right lower lobe (RLL), left upper lobe (LUL), and left lower lobe (LLL).
   (d) Locations of voxels on the airway centerlines.
   (e) Endoluminal views of every viewing site along the airway centerlines.
2. Aorta:
   (a) Superior and inferior limits of the aortic arch.
   (b) Anterior, posterior, and right and left lateral limits of the aortic arch, ascending aorta, and descending aorta on corresponding 2D MDCT slices.
   (c) Positions of voxels located at the center of the ascending aorta on every 2D transverse slice.
3. Pulmonary Artery: Minimum bounding rectilinear region that encompasses the segmented pulmonary artery.
4. Lungs:
   (a) Superior, inferior, anterior, posterior, and left and right lateral limits of the lungs.
   (b) Locations of the roots of the two lungs, where the RMB and LMB intersect with the lungs.
   (c) Location where the volumes of the left and/or right lungs decrease dramatically in the vertical direction. This location is considered as the position where the abdomen appears.
5. Vertebrae and Sternum:
   (a) Anterior limit of the vertebrae on every transverse slice.
   (b) Posterior limit of the sternum on every transverse slice. (c) Location where the sternal notch appears in vertical direction.

More landmarks may be extracted and the invention may comprise extracting more or less landmarks. In one embodiment, the following additional steps are used to create the final definition of the stations:

1. Mountain stations 1 and 2 are grouped as one station, because the inferior limit of station 1 (or the superior limit of station 2) is not clear and varies among patients.
2. Mountain stations 10 and 11 are combined into one station, because there is no explicit boundary between them in MDCT images.
3. Mountain stations 12, 13, and 14 are also grouped for the same reason as stations 10 and 11.

Figure 4A:
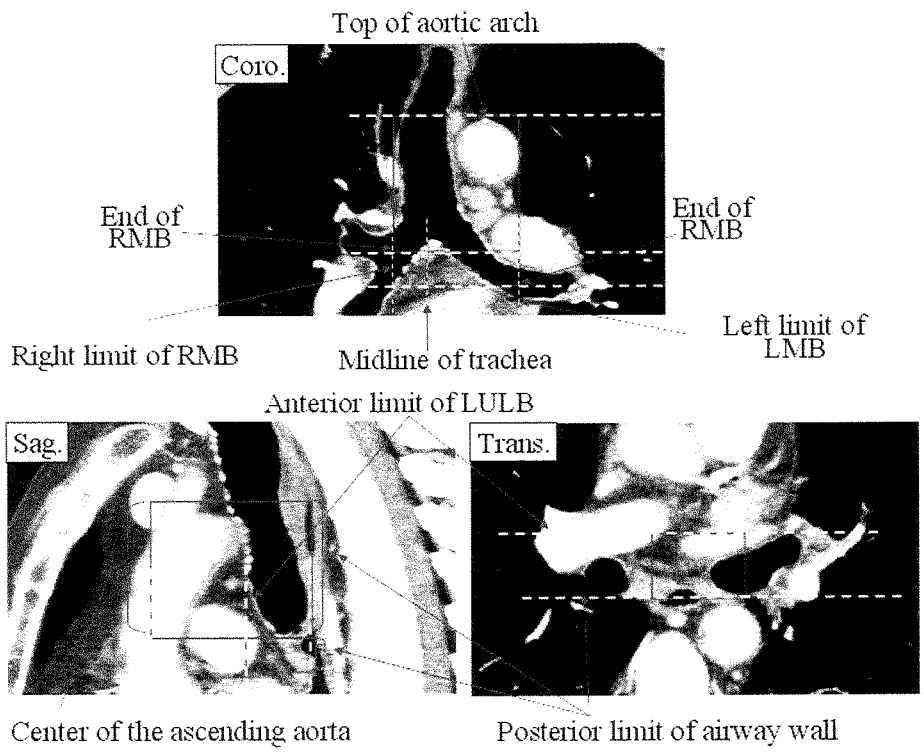
FIG. 4(a) shows an example of how the Mountain-based M4 station is defined in one embodiment. Station M4 begins at the top of the aortic arch. It ends at the lower limit of the RMB and LMB. Anteriorly, it is posterior to the center of the ascending aorta or the anterior wall of the LULB. Posteriorly, it is in front of posterior wall of the airways. Laterally, it is limited by the end of the RMB and LMB, and the center of the trachea.
Figure 4B:
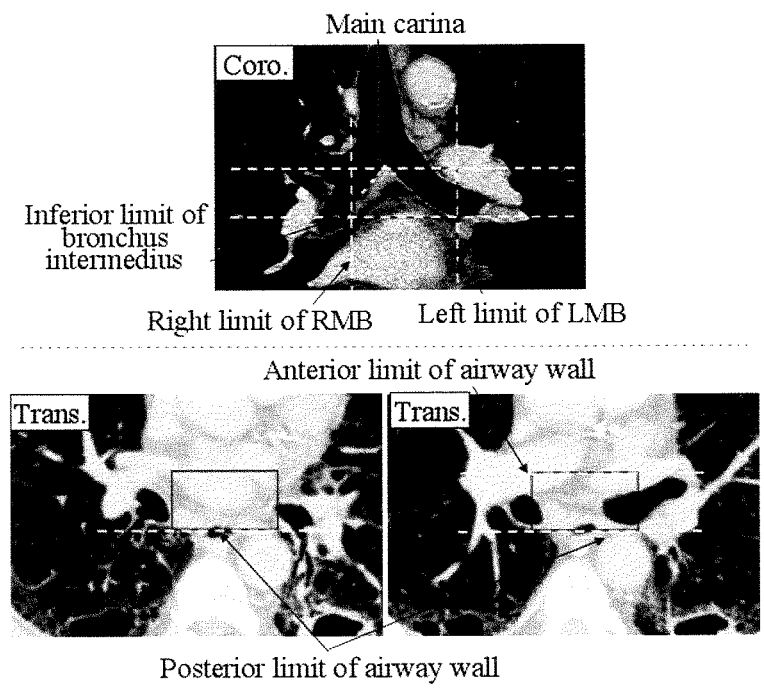
FIG. 4(b) shows an example of how the Mountain-based M7 station is defined in one embodiment. Superiorly, it begins at the main carina. Inferiorly, it is above the inferior limit of the bronchus intermedius. Its anterior and posterior limits are located by the anterior and posterior limits of the airway wall. Laterally, it is bounded by the right and left limits of the RMB and LMB, respectively. Two transverse views for M7 are displayed using the lung window, while all other views are displayed using the mediastinal window. Rectangles, consisting of red lines, are presented as the regions of lymph-node stations. Blue dash lines indicate boundary limits of these defined stations related to chest structures.

In another embodiment, additional stations are combined to create a revised station, or area. FIGS. 4(a) and 4(b) shows examples of how stations M4 and M7 are defined. 2D section views (Trans.—Transverse, Coro.—Coronal, and Sag.—Sagittal) are displayed using the mediastinal window (window width 400 and window level −160) or the lung window (window width 1600 and window level −1150).

Station Visualization and Lymph-Node Definition

After the automatic definition of the stations, in one embodiment, the user can interact with the processed results. This allows the user to, amongst other things, visualize the stations, modify the stations, and modify the definition of visible lymph nodes.

A graphical user interface (GUI) facilitates interaction between the user and the results. In one embodiment, the GUI of the system includes, but is not limited to, the following components:

1. Station maps. Interactive pictures of the lymph-node station maps, derived from the Mountain and Wang systems, allow for locating a specific lymph-node station, as listed in Table 1.
2. Primary display window. It provides the following display modes:
   (a) Slice view. It allows for displaying single or multiple 2D slice views (transverse, coronal, and sagittal), as shown in FIG. 2.

(b) 3D surface view. It presents the airway tree, segmented lymph nodes, aorta, pulmonary artery, and lymph-node stations in 3D, as show in FIGS. 5(a) and 5(b).

(c) Endoluminal view. It is incorporated with 2D slice views and used to present the Wang stations.

3. Preprocessing and station definition. Many tools are provided for processing anatomical structures, extracting landmarks, defining lymph-node stations, and locating/activating a defined station.

4. Display and station modification. Many controls allow for the selection of different display modes and modification of defined lymph-node stations. The user can also change display windows for 2D slice views.

Figure 6:
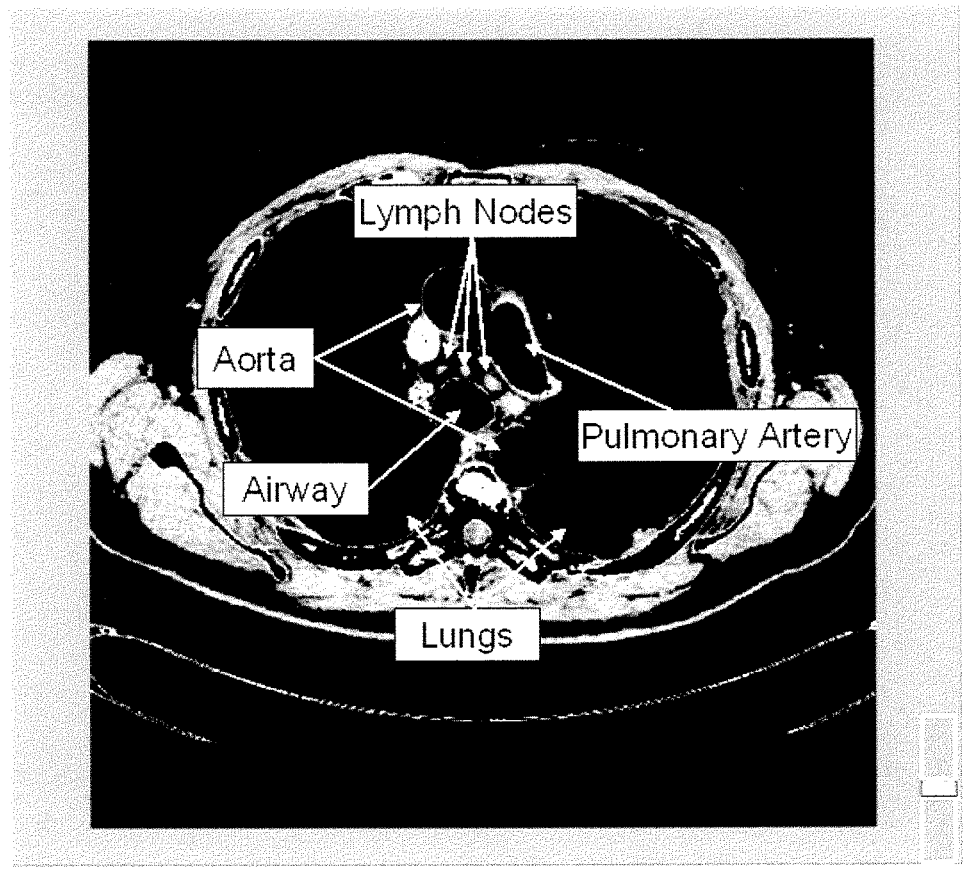
FIG. 6 shows usage of tissue removal controls. Transverse slice 216, on which the segmented airway tree, aorta, pulmonary artery, lungs, and voxels with intensities outside the range ([−25,155]) were excluded.
Figure 7A:
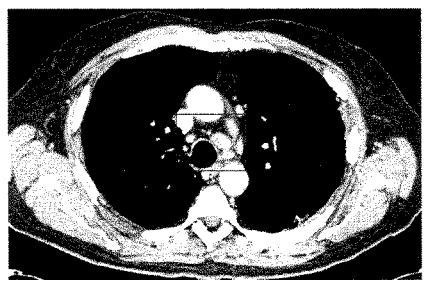
FIGS. 7(a) to 7(d) show a lymph-node station definition for station M4. This station is presented by two cuboid regions, which are highlighted on all orthogonal slice views and 3D surface view. Slice images are displayed using the mediastinal window.
Figure 7B:
Figure 7C:
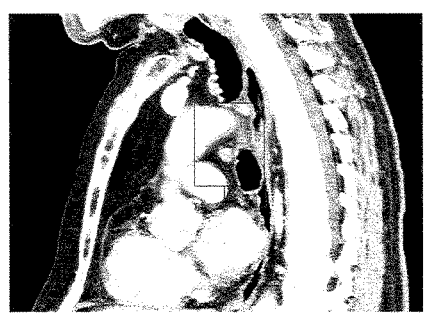
Figure 7D:
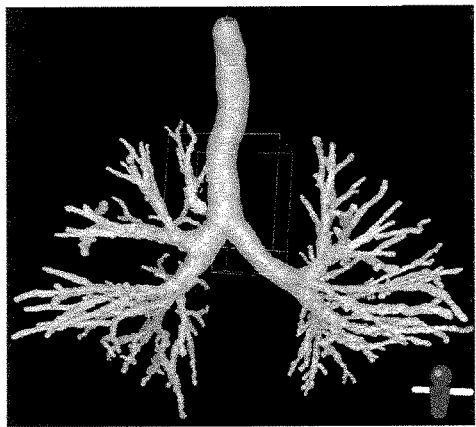
Figure 8A:
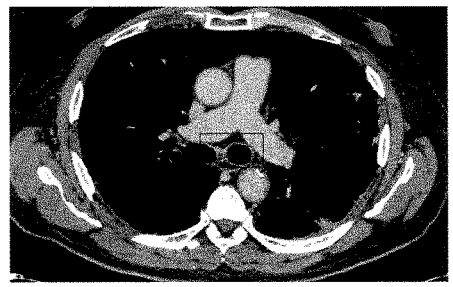
FIGS. 8(a) to 8(d) show examples of lymph-node station definition for station M7. This station is presented by a cuboid region, which is highlighted on all orthogonal slice views and 3D surface view. Slice images are displayed using the mediastinal window.
Figure 8B:
Figure 8C:
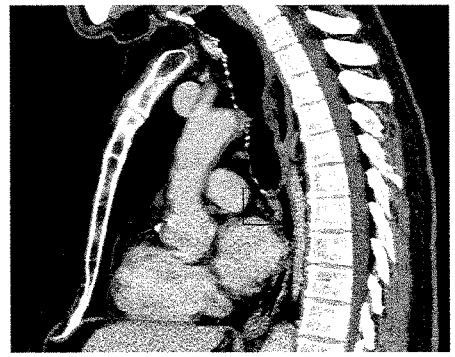
Figure 8D:
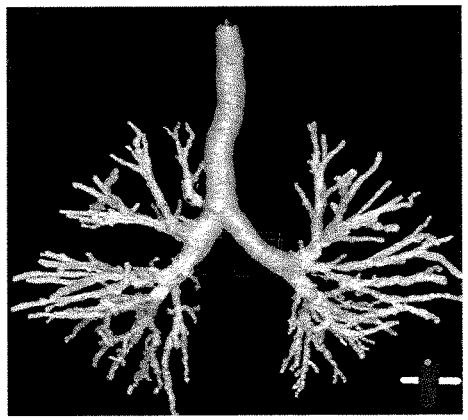
Figure 9A:
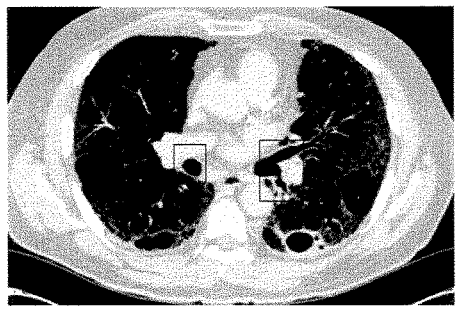
FIGS. 9(a) to 9(e) show examples of lymph-node station definition for station MIO-I 1. This station is presented by two cuboid regions, which are highlighted on all orthogonal slice views and 3D surface view. Slice images are displayed using the lung window.
Figure 9B:
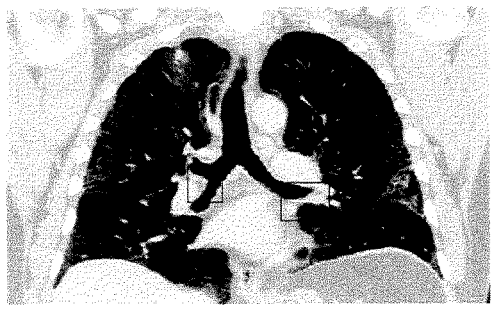
Figure 9C:
Figure 9D:
Figure 9E:
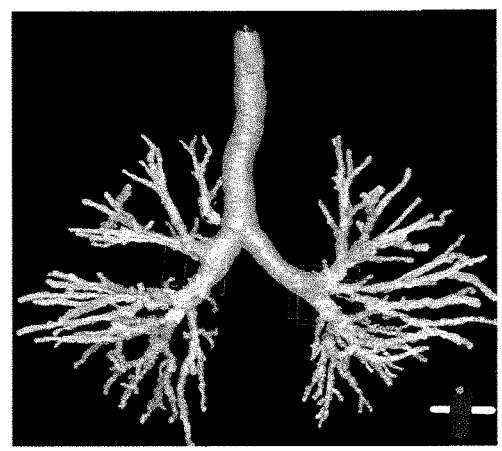
Figure 10A:
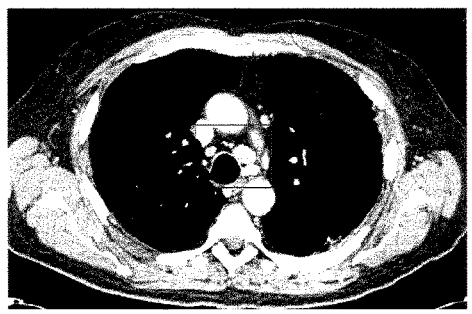
FIGS. 10(a) to 10(d) shows an example of lymph-node segmentation for station M4 with the defined station highlighted. All lymph nodes stay inside the cuboid region of this station, and are displayed in the color derived from the Mountain system. The mediastinal window was used for 2D slice display.
Figure 10B:
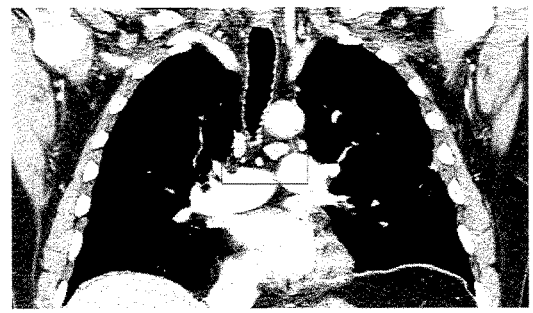
Figure 10C:
Figure 10D:
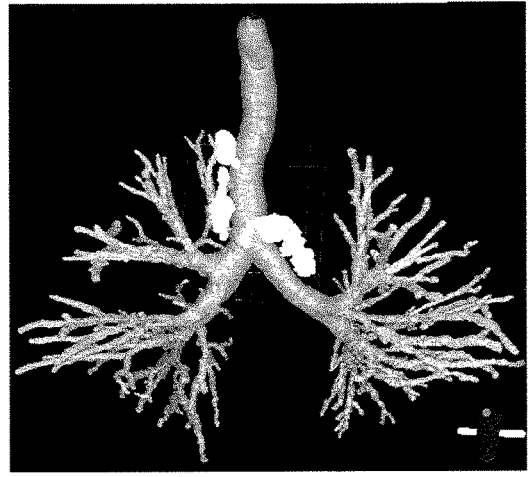

5. Tissue removal. This enables the removal of key structures, including the airway tree, aorta, pulmonary artery, and lungs, from 2D slice views, as shown in FIG. 6. It also allows for excluding voxels whose intensities are outside a selected range. The purpose of these controls is to provide flexibility for detecting lymph nodes on 2D slice images, so as to speed up lymph-node-related operations.

6. Segmentation. Controls exist for segmenting visible lymph nodes in a selected station area. The station information of a defined lymph node is embedded automatically or manually in the segmentation result, so as to classify or group segmented lymph nodes for follow-up clinical applications.

The system provides many tools for highlighting, enhancing, and semi-automatically segmenting lymph nodes in images (e.g., 3D MDCT images).

In one embodiment, lymph-node segmentation is carried out using a live-wire-based semiautomatic method. In another embodiment, lymph-node segmentation is carried out using a manual slice method.

Figure 5A:
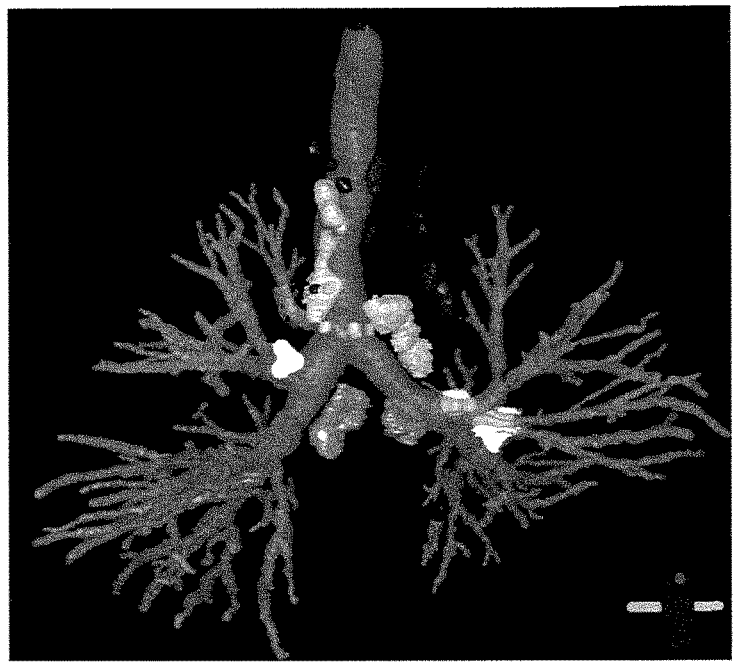
FIGS. 5(a) to 5(b) show examples of the 3D surface view. Nodal stations were defined and visible lymph nodes were segmented and grouped.
Figure 5B:

FIGS. 5(a)-5(b) shows all segmented lymph nodes for an exemplary 3D MDCT scan, where the colors are derived from the Mountain system and serve as station labels.

EXAMPLE

A computer-based system as described herein has been applied to 21 human MDCT scans, as summarized in Table 2. In particular, for each scan, 10 lymph-node stations derived from the Mountain system and 11 Wang stations, as listed in Table 1, were automatically defined by the system. Examples given below are derived from the same human 3D MDCT image IRB20349.3.3. The Mountain stations are presented using three 2D section views and one 3D surface view.

TABLE 2

Summary of 21 cases involved in the study. The scans were derived from two IRB protocols Spatial resolution and the use of contrast agent is noted.

| Series | # of Scans | ΔZ | ΔX, ΔY 0.52--0.65 mm | ΔX, ΔY 0.65--0.86 mm | Contrast Agent Applied? Yes | Contrast Agent Applied? No |
|---|---|---|---|---|---|---|
| 21405 | 8 | 0.5 mm | 5 | 3 | 3 | 5 |
| 20349.3 | 13 | 0.5 mm | 7 | 6 | 6 | 7 |

FIGS. 7(a)-7(d), FIGS. 8(a)-8(d), and FIGS. 9(a)-9(e) give processed examples of stations M4, M7, and M10-11. Station M4 with visible lymph nodes segmented is shown in FIGS. 10(a)-10(d), while the complete segmentation result of lymph nodes appears in FIGS. 5(a)-5(b).

See also U.S. patent application Ser. No. 11/437,230, filed May 19, 2006; Ser. No. 11/437,229, filed May 19, 2006; Ser. No. 12/022,620, filed Jan. 30, 2008; Ser. No. 12/018,953, filed Jan. 24, 2008; 61/028,562, filed Feb. 14, 2008; and 61/028,607, filed Feb. 14, 2008.

Lymph Node Station Mapping References

[1] S. G. Armato and G. McLennan and M. F. McNiff-Gray and C. R. Meyer and D. Yankelevitz and D. R. Aberle and C. I. Henschke and E. A. Hoffman and E. A. Kazerooni and H. MacMahon and A. P. Reeves and B. Y. Croft and L. P. Clarke. Lung Image Database Consortium: Developing a Resource for the Medical Imaging Research Community. Radiology, 232(3):739-748, 2004.

[2] P. Boiselle and E. Patz and D. Vining and R. Weissleder and J. Shepard and T. McLoud. Imaging of mediastinal lymph nodes: CT, MR, and FDG PET. Radiographics, 18(5): 1061-1070, 1998.

[3] O. Chapet and F.-M. Kong and L. E. Quint and A. C. Chang and R. K. Ten-Haken and A. Eisbruch and J. A. Hayman. CT-Based Definition of Thoracic Lymph Node Stations: An Atlas from the University of Michigan. Int. J. Radiation Oncology Biol. Phys., 63(1): 170-178, 2005.

[4] D. Chen and J. Yao. Improved Livewire Method for Segmentation on Low Contrast and Noisy Images. In J. P. W. Pluim and J. M. Reinhardt, editors, SPIE Medical Imaging 2007: Image Processing, pages 651222Z, 2007.

[5] M. Cymbalista and A. Waysberg and P. Grenier et al. CT demonstration of the 1996 AJCC-UICC regional lymph node classification for lung cancer staging. Radiographics. 19:899-899, 1999.

[6] J. Dornheim and H. Seim and B. Preim and I. Hertel and G. Strauss. Segmentation of Neck Lymph Nodes in CT Datasets with Stable 3D Mass-Spring Models. Medical Image Computing and Computer-Assisted Intervention—MICCAI 2006, 4191:904-911, 2006.

[7] A. X. Falcáo and J. K. Udupa and S. Samarasekera and S. Sharma. User-Steered Image Segmentation Paradigms: Live Wire and Live Lane. Graphical Models and Image Processing, 60(4):233-260, 1998.

[8] C. I. Fetita and F. Preteux and C. Beigelman-Aubry and P. Grenier. Pulmonary Airways: 3-D Reconstruction From Multislice CT and Clinical Investigation. IEEE Trans. on Medical Imaging, 23(11): 1353-1364, 2004.

[9] C. I. Fetita and F. Preteux and C. Beigelman-Aubry and P. Grenier. Pulmonary airways: 3-D reconstruction from multislice CT and clinical investigation. /EEETMI, 23(11): 1353-1364, 2004.

[10] Q. Gao and S. Wang and D. Zhao and J. Liu. Accurate Lung Segmentation for X-ray CT Images. IEEE Third International Conference on Natural Computation 2007 (ICNC 2007), 2:275-279, 2007.

[11] M. W. Graham and M. Y. Dolina and R. Bascom and W. E. Higgins. Graphics-Based Computer System for the Anatomical Labeling of the Major Airways: Initial Development. American Thoracic Society (ATS) 2007, Am. J. Respiratory and Critical Care Medicine, pages A333, 2007.

[12] M. W. Graham and J. D. Gibbs and W. E. Higgins. Robust system for human airway-tree segmentation. In J. M. Reinhardt and J. P. W. Pluim, editors, SPIE Medical Imaging 2008: Imaging Processing, 2008.

[13] I. Hasegawa and K. Eguchi and E. Kohda and Y. Tanami and T. Mori and H. Hatabu and S. Kuribayashi. Pulmonary Hilar Lymph Nodes in Lung Cancer: Assessment with 3D Dynamic Contrast-Enhanced MR Imaging. European Journal of Radiology, 45: 123-134, 2003.

[14] W. E. Higgins and L. Rai and S. A. Merritt and K. Lu and N. T. Linger and K. C. Yu. 3D image fusion and guidance for computer-assisted bronchoscopy. In Bahram Javidi and Fumio Okano and Jung-Young Son, editors, SPIE Optics East: Three-Dimensional TV, Video, and Display IV, pages 86-100, 2005.

[15] D. Honea and Y. Ge and W. Snyder and P. Hemler and D. Vining. Lymph node segmentation using active contours. SPIE Medical Imaging, 3034:265-273, 1997.

[16] D. Honea and W. Snyder. Three-dimensional active surface approach to lymph node segmentation. SPIE Conf. Image Processing, 3661: 1003-1011, 1999.

[18] S. Hu and E. A. Hoffman and J. M. Reinhardt. Automatic Lung Segmentation for Accurate Quantitation of Volumetric X-ray CT Images. IEEE Trans. Medical Imaging, 20(6):490-498, 2001.

[18] S. Hu and E. A. Hoffman and J. M. Reinhardt. Automatic Lung Segmentation for Accurate Quantitation of Volumetric X-Ray CT Images. IEEE Transactions on Medical Imaging, 20(6):490-498, 2001.

[19] A. Jemal and R. Siegel and E. Ward and T. Murray and J. Xu and M. J. Thun. Cancer Statistics 2007. CA Cancer J. Clin., 57:43-66, 2007.

[20] H.-S. Kim and H.-S. Yoon and K.-N. Trung and G.-S. Lee. Automatic Lung Segmentation in CT Images Using Anisotropic Diffusion and Morphology Operation. Seventh IEEE Conference on Computer and Information Technology 2007 (CIT 2007), 557-561, 2007.

[22] A. P. Kiraly and W. E. Higgins and E. A. Hoffman and G. McLennan and J. M. Reinhardt. 3D Human Airway Segmentation Methods for Virtual Bronchoscopy. Academic Radiology, 9(10): 1153-1168, 2002.

[22] A. P. Kiraly and E. A. Hoffman and G. McLennan and W. E. Higgins and J. M. Reinhardt. 3D Human Airway Segmentation Methods for Clinical Virtual Bronchoscopy. Academic Radiology, 9(10): 1153-1168, 2002.

[23] A. P. Kiraly and D. P. Naidich and L. Guendel and L. Zhang and C. L. Novak. Novel Method and Applications for Labeling and Identifying lymph Nodes. In A. Manduca and C. P. Hu, editors, SPIE Medical Imaging 2007: Physiology, Function, and Structure from Medical Images, pages 651111-1-9, 2007.

[24] T. Kitasaka and Y. Tsujimura and Y. Nakamura and K. Mori and Y. Suenaga and M. Ito and S. Nawano. Automated Extraction of Lymph Nodes from 3-D Abdominal CT Images Using 3-D Minimum Directional. Difference Filter. Medical Image Computing and Computer-Assisted Intervention—MICCAI 2006, 4792:336-343, 2007.

[25] J. P. Ko and E. A. Drucker and J. O. Shepard and C. F. Mountain and C. Dresler and B. Sabloff and T. C. McLoud. CT Depiction of Regional Nodal Stations for Lung Cancer Staging. Am. J. Roentgenol, 174(3):775-782, 2000.

[27] K. Lu and W. E. Higgins. Interactive Segmentation Based on the Live Wire for 3D CT Chest Image Analysis. International Journal of Computer Assisted Radiology and Surgery, 2(3-4): 151-167, 2007.

[28] K. Lu and W. E. Higgins. Improved 3D live-wire method with application to 3D CT chest image analysis. In J. M. Reinhardt and J. P. W. Pluim, editors, SPIE Medical Imaging 2006: Image Processing, pages 189-203, 2006.

[29] Kongkuo Lu. Multidimensional Image Segmentation and Pulmonary Lymph-Node Analysis. PhD thesis, the Pennsylvania State University, Electrical Engineering Department, the Pennsylvania State University, University Park, Pa. 16802, USA, 2008.

[30] S. A. Merritt and L. Rai and W. E. Higgins. Real-time CT-video registration for continuous endoscopic guidance. In A. Manduca and A. A. Amini, editors, SPIE Medical Imaging 2006: Physiology, Function, and Structure from Medical Images, pages 370-384, 2006.

[31] A. Misra and M. Rudrapatna and A. Sowmya. Automatic Lung Segmentation: A comparison of Anatomical and Machine Learning Approaches. IEEE Proc. of the Intelligent Sensors, Sensor Networks, and Information Porcessing Conference 2004:451-456, 2004.

[32] E. N. Mortensen and W. A. Barrett. Interactive Segmentation with Intelligent Scissors. Graphical Models and Image Processing, 60(5):349-384, 1998.

[33] C. Mountain. Revisions in the international system for. staging lung cancer. Chest, 111(6): 1710-1717, 1997.

[34] C. Mountain. Staging Classification of Lung Cancer. A Critical Evaluation. Clin. Chest Med., 23(1): 103-121, 2002.

[35] C. Mountain and C. Dresler. Regional lymph node classification for lung cancer staging. Chest, 111(6): 1718-1723, 1997.

[36] C. F. Mountain. A new international staging system for lung cancer. Chest, 89:225S-233S, 1986.

[37] K. Okada and D. Comaniciu and A. Krishnan. Robust anisotropic Gaussian fitting for volumetric characterization of Pulmonary nodules in multislice CT. IEEE Transactions on Medical Imaging, 24(3):409-423, 2005.

[38] K. Poon and G. Hamarneh and R. Abugharbieh. Segmentation of Complex Objects with Non-Spherical Topologies from Volumetric Medical Images Using 3D Livewire. In J. P. W. Pluim and J. M. Reinhardt, editors, SPIE Medical Imaging 2007: Image Processing, pages 651231-1-10, 2007.

[39] L. E. Quint. Lung Cancer: CT Staging. Cancer Imaging, 4: 1-5, 2004.

[40] J. Rogowska and K. Batchelder and S. Gazelle and E. Halpern and W. Connor and G. Wolf. Evaluation of selected two-dimensional segmentation techniques for computed tomography of lymph nodes. Invest. Radiol, 31(3): 138-145, 1996.

[41] H. Shen and B. Goebel and B. Odry. A new algorithm for local surface smoothing with application to chest wall nodule segmentation in lung CT data. In J. M. Fitzpatrick and M. Sonka, editors, SPIE Medical Imaging 2004: Image Processing, pages 1519-1526, 2004.

[42] R. Shojaii and J. Alirezaie and P. Babyn. Automatic Lung Segmentation in CT Images Using Watershed Transform. IEEE Conference on Image Processing 2005 (ICIP 2005), 2:11-1270-3, 2005.

[43] S. Sun and H. Li and X. Hou and Y. Kang and H. Zhao. Automatic Segmentation of Pulmonary Nodules in CT Images. 1st International Conference on Bioinformatics and Biomedical Engineering 2007 (ICBBE 2007):790-793, 2007.

[44] P. Taeprasartsit and W. E. Higgins. Method for Extracting the Aorta from 3D CT Images. In J. M. Reinhardt and P. W. Pluim, editors, SPIE Medical Imaging 2007: Image Processing, 2007.

[45] O. Talakoub and J. Alirezaie and P. Babyn. Lung Segmentation in Pulmonary CT Images using Wavelet Transform. IEEE International Conference on Acoustics, Speech and Signal Processing 2007 (ICASSP 2007), 1:1453-1456, 2007.

[46] O. Talakoub and E. Helm and J. Alirezaie and P. Babyn and B. Kavanagh and F. grasso and D. Engelberts. An Automatic Wavelet-Based Approach for Lung Segmentation and Density Analysis in Dynamic CT. IEEE Symposium on Computational Intelligence in Image and Signal Processing 2007 (CUSP 2007):369-374, 2007.

[47] G. Unal and G. Slabaugh and A. Ess and A. Yezzi and T. Fang and J. Tyan and M. Requardt and R. Krieg and R. Seethamraju and M. Harisinghani and R. Weissleder. Semi- Automatic Lymph Node Segmentation in LN-MRI. IEEE International Conference on Image Processing 2006:77-80, 2006.

[48] K. Wang. Staging of bronchogenic carcinoma by bronchoscopy. Chest, 106(2):588-593, 1994.

[49] W. Wieclawek. Live-wire Method With FCM Classification. IEEE Proc. International Conference on Mixed Design of Integrated Circuits and System:756-76, 2006.

[50] J. Yan and T. Zhuang and B. Zhao and L. H. Schwartz. Lymph Node Segmentation from CT Images Using Fast Marching Method. Computerized Medical Imaging and Graphics, 28(1-2):33-38, 2004.

[51] Y. Yim and H. Hong and Y. G. Shin. Hybrid Lung Segmentation in Chest CT Images for Computer-Aided Diagnosis. IEEE Proc. of 7th International Workshop on Enterprise Networking and Computing in Healthcare Industry 2005 (HEALTHCOM 2005), 378-383, 2005.

All patents, applications, and publications referenced above are hereby incorporated by reference in their entirety.

The invention includes any number of combination of method and devices, or aspects of such methods and devices where such combinations are possible. The disclosure and invention specifically include combination of features and steps of various embodiments as well as combinations of the various embodiments where possible.

The invention claimed is:

1. A method for automatically identifying at least one lymph node station in a thoracic region of a patient, said method comprising the steps of:
   calculating a 3D model of at least one anatomical structure in the chest based on 3D image data;
   calculating at least one anatomical cue derived from said at least one anatomical structure; and
   calculating at least one lymph node station based on said 3D image data and using said at least one anatomical cue wherein said calculating at least one lymph node station is performed automatically, the calculating step comprising automatically computing a plurality of Mountain Stations based on said 3D image data and automatically computing which of said Mountain Stations are accessible via a bronchoscope.

2. The method of claim 1 further comprising displaying said at least one lymph node station in a view.

3. The method of claim 1 wherein said anatomical structure comprise at least one of the patient's airway tree, aorta, pulmonary artery, lungs, vertebrae, and sternum from the image data.

4. The method of claim 3 wherein said anatomical structure comprise the airway tree, and said method further comprising calculating centerlines through the airways of the airway tree.

5. The method of claim 4 further comprising labeling individual airways of the airway tree.

6. The method of claim 1 wherein said calculating the at least one lymph node station is performed entirely automatically.

7. The method of claim 1 further comprising accepting input regarding a lymph node of the station.

8. The method of claim 7 further comprising calculating the lymph node within the station based on said input.

9. The method of claim 8 further comprising displaying said lymph node.

10. The method of claim 5 wherein said lymph node station is station M7, and said anatomical cues comprise a main carina, an inferior limit of a bronchus intermedius, a right limit of the right main bronchus, and left limit of the left main bronchus.

11. The method of claim 2 comprising displaying said station in a 3D view and a 2D multiplanar formatted image section.

12. The method of claim 1 comprising adjusting the anatomical cues.

13. The method of claim 2 comprising adjusting the view of the station.

14. The method of claim 1 further comprising calculating at least 10 Mountain Stations.

15. A computing system for calculating at least one lymph node station based on 3D image data of a patient's thoracic region, said system comprising:
   a memory storing said image data;
   a processor in communication with said memory, the processor being operative to:
   a) calculate a 3D model of at least one anatomical structure in the chest of the patient based on said 3D image data;
   b) calculate at least one anatomical cue derived from said at least one anatomical structure; and
   c) calculate said at least one lymph node station based on said 3D image data and at least one anatomical cue, the calculating comprising automatically computing a plurality of Mountain Stations based, on said 3D image data and automatically computing which of said Mountain Stations are accessible via a bronchoscope.

16. The system of claim 15 further comprising a node tool to accept input regarding a lymph node within said lymph node station, and said processor being operative to calculate said lymph node in 3D.

17. The system of claim 15 further comprising a cue tool to adjust said at least one anatomical cue.

18. The system of claim 15 comprising a display and a display tool to adjust the view of the station.

19. A method for automatically identifying at least one lymph node station in a thoracic region of a patient, said method comprising the steps of:
   calculating a 3D model of at least one anatomical structure in the chest based on 3D image data, the at least one anatomical structure including No-Fly zones being regions which should not be punctured;
   calculating at least one anatomical cue derived from said at least one anatomical structure; and
   calculating at least one lymph node station based on said 3D image data and using said at least one anatomical cue wherein said calculating at least one lymph node station is performed automatically, the calculating step comprising automatically computing a plurality of Mountain Stations based on the 3D image data and automatically computing which of said Mountain Stations are accessible, and thereby avoiding the No-Fly zones.

* * * * *

UNITED STATES PATENT AND TRADEMARK OFFICE
CERTIFICATE OF CORRECTION

| | |
|---|---|
| PATENT NO. | : 10,482,606 B2 |
| APPLICATION NO. | : 15/596553 |
| DATED | : November 19, 2019 |
| INVENTOR(S) | : William E. Higgins et al. |

It is certified that error appears in the above-identified patent and that said Letters Patent is hereby corrected as shown below:

In the Specification

Column 1, Lines 16-22, please replace with this statement This invention was made with government support under Grant Nos. CA091534 and CA074325 awarded by the National Institutes of Health. The Government has certain rights in the invention.

Signed and Sealed this
Fourteenth Day of October, 2025

John A. Squires
*Director of the United States Patent and Trademark Office*